(12) United States Patent
Newstadt et al.

(10) Patent No.: US 8,752,038 B1
(45) Date of Patent: Jun. 10, 2014

(54) REDUCING BOOT TIME BY PROVIDING QUANTITATIVE PERFORMANCE COST DATA WITHIN A BOOT MANAGEMENT USER INTERFACE

(75) Inventors: Keith Newstadt, Newton, MA (US); Shaun Cooley, El Segundo, CA (US); Vijay Bhaskar Perumal, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1713 days.

(21) Appl. No.: 12/049,920

(22) Filed: Mar. 17, 2008

(51) Int. Cl.
 G06F 9/44 (2006.01)
 G06F 9/00 (2006.01)

(52) U.S. Cl.
 USPC .............. 717/168; 717/120; 717/170; 713/2

(58) Field of Classification Search
 None
 See application file for complete search history.

(56) References Cited

U.S. PATENT DOCUMENTS

| | | | | |
|---|---|---|---|---|
| 5,761,091 | A * | 6/1998 | Agrawal et al. | 702/186 |
| 5,930,503 | A * | 7/1999 | Drees | 713/1 |
| 6,052,800 | A * | 4/2000 | Gentile et al. | 714/36 |
| 6,336,185 | B1 * | 1/2002 | Sargenti et al. | 713/2 |
| 6,463,531 | B1 * | 10/2002 | Aguilar et al. | 713/2 |
| 7,243,245 | B2 * | 7/2007 | Pagan | 713/300 |
| 7,392,518 | B1 * | 6/2008 | Chhabra et al. | 717/168 |
| 7,702,891 | B1 * | 4/2010 | Nazarov et al. | 713/1 |
| 7,765,393 | B1 * | 7/2010 | Lee et al. | 713/2 |
| 7,949,998 | B2 * | 5/2011 | Bleisch et al. | 717/120 |
| 7,971,199 | B1 * | 6/2011 | Chen | 717/168 |
| 8,453,139 | B2 * | 5/2013 | Tanaka et al. | 717/170 |
| 2002/0087959 | A1 * | 7/2002 | Mangold et al. | 717/168 |
| 2002/0161868 | A1 * | 10/2002 | Paul et al. | 709/221 |
| 2003/0005096 | A1 * | 1/2003 | Paul et al. | 709/222 |
| 2003/0172372 | A1 * | 9/2003 | Crisan et al. | 717/170 |
| 2005/0071665 | A1 * | 3/2005 | Zimmer et al. | 713/200 |
| 2005/0132375 | A1 * | 6/2005 | Douceur et al. | 718/100 |
| 2005/0223358 | A1 * | 10/2005 | Rothman et al. | 717/120 |
| 2006/0149959 | A1 * | 7/2006 | Rothman et al. | 713/2 |
| 2006/0161784 | A1 * | 7/2006 | Hunter et al. | 713/182 |
| 2007/0006150 | A9 * | 1/2007 | Walmsley | 717/120 |
| 2007/0288739 | A1 * | 12/2007 | Dale et al. | 713/2 |
| 2008/0279098 | A1 * | 11/2008 | Park | 370/230 |
| 2009/0064125 | A1 * | 3/2009 | Venkatachalam et al. | 717/170 |
| 2009/0138865 | A1 * | 5/2009 | Furbee et al. | 717/168 |
| 2009/0144532 | A1 * | 6/2009 | Arafeh | 713/2 |
| 2010/0017591 | A1 * | 1/2010 | Smith et al. | 713/2 |

OTHER PUBLICATIONS

Werner Almesberger, Booting Linux: The History and the Future, 2000, pp. 1-13.*
Daniel Parthey, Booting LInux Really Fast, 2006, pp. 7-14 and pp. 20-22.*
Wouter Borremans, How does booting work on Free BSD, MAC and Gentoo Linux, 2004, pp. 3-7.*

* cited by examiner

*Primary Examiner* — Thuy Dao
*Assistant Examiner* — Mongbao Nguyen
(74) *Attorney, Agent, or Firm* — Brill Law Office; Jeffrey Brill

(57) ABSTRACT

The performance of a boot sequence is improved by presenting the user with easy to read information concerning the performance cost of each boot time application, and allowing the user to remove processes from the boot sequence or uninstall them altogether. Processes associated with the boot sequence are identified, and their corresponding performance cost is determined as percentage of the performance cost of the entire boot sequence, or according to the time they take to execute. The identified processes and their associated performance costs are presented to the user, along with a user interface component for selecting processes to remove from the boot sequence and/or uninstall. Responsive to input from the user, selected processes are removed from the boot sequence and/or uninstalled as directed.

17 Claims, 1 Drawing Sheet

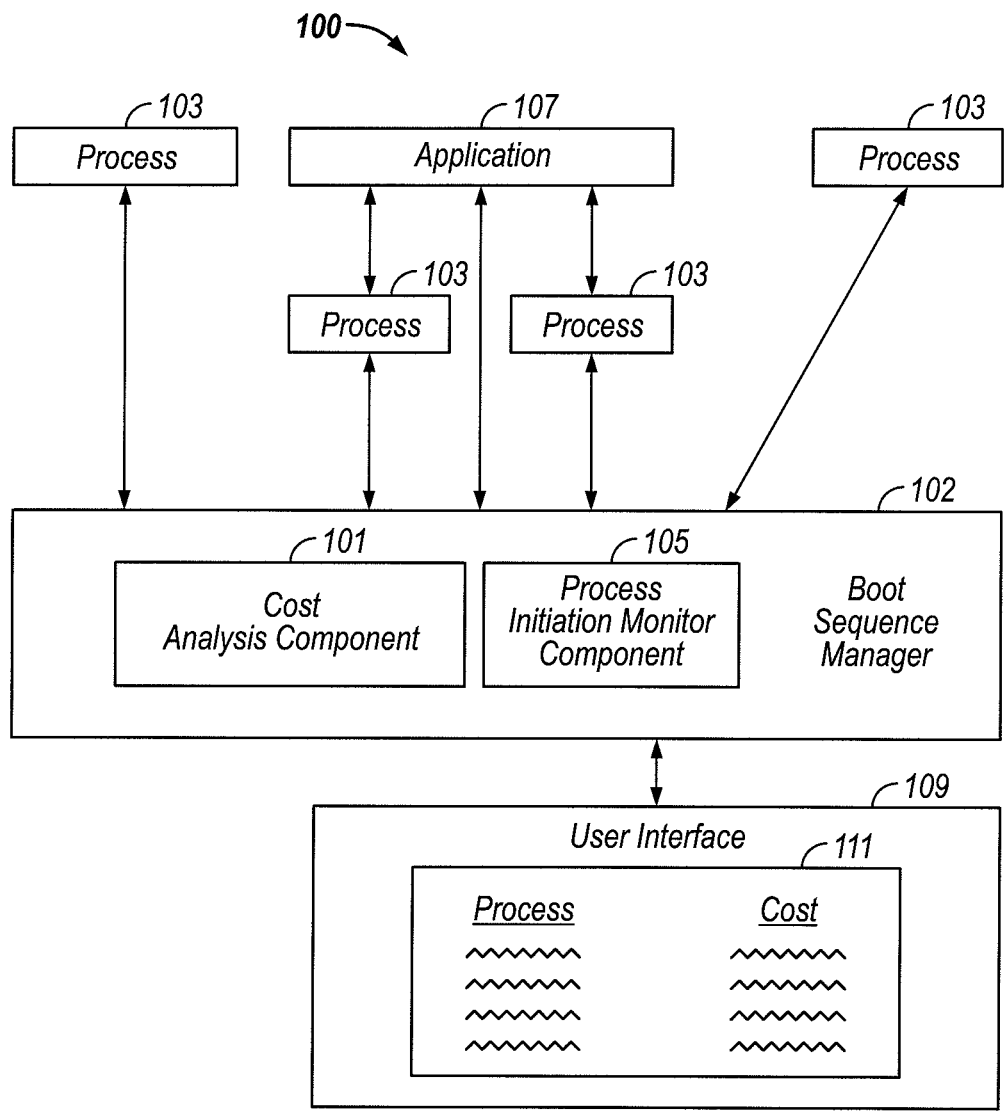

REDUCING BOOT TIME BY PROVIDING QUANTITATIVE PERFORMANCE COST DATA WITHIN A BOOT MANAGEMENT USER INTERFACE

TECHNICAL FIELD

This invention pertains generally to improving computer performance, and more specifically to enabling end users to intelligently and easily improve their boot sequence performance.

BACKGROUND

Poor performance of personal computers is a common user complaint. One of the most common performance issues is the length of time it takes for a computer to start-up. As more and larger applications are loaded at boot time, this problem becomes progressively worse. Unfortunately, the typical computer user is unable to improve computer boot sequence performance because s/he 1) does not know the approximate cost of the various processes in the boot sequence; 2) does not know that multiple processes started at boot time might be associated with the same application; and 3) does not know how to remove undesired applications and processes from the boot sequence.

Commercial tools are available to show the applications started during the boot process, and to allow the user to remove them. However, these tools do not indicate what gain that would result from removing which application, or the multiple processes that can be associated with individual different applications. Other tools, such as Microsoft's Bootvis®, provide monitoring of system resources during the boot process. Bootvis® is a performance tracing and visualization tool to help system designers and software developers identify performance issues for boot/resume timing while developing new products or supporting software. However, Bootvis® is not a tool that can improve boot performance for end users.

It would be desirable to enable end users to intelligently and easily improve their boot sequence performance.

SUMMARY

The performance of a boot sequence is improved by presenting the user with easy to read information concerning the performance cost of each boot time application, and allowing the user to remove processes from the boot sequence or uninstall them altogether. Processes associated with the boot sequence are identified, and their corresponding performance cost is determined as percentage of the performance cost of the entire boot sequence, or according to the time they take to execute. The identified processes and their associated performance costs are presented to the user, along with a user interface component for selecting processes to remove from the boot sequence and/or uninstall. Responsive to input from the user, selected processes are removed from the boot sequence and/or uninstalled as directed.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a block diagram illustrating a system for improving boot sequence performance, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 in which a Boot Sequence Manager 102 enables users to intelligently and easily improve their boot sequence performance, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a Cost Analysis Component 101 of the Boot Sequence Manager 102 is loaded early in the system boot sequence, in order to monitor all boot related processes 103. For each boot time process 103, the Cost Analysis Component 101 monitors process 103 activity (e.g., central processing unit ("CPU"), memory, disk, network, etc., usage) and estimates the performance of the process 103 relative to the overall boot sequence. Each process 103 is monitored during the boot sequence to determine its performance cost. The Cost Analysis Component 101 estimates each process's 103 cost to boot sequence performance, represented as, e.g., a percentage or a time cost. The implementation mechanics of monitoring boot related processes 103 and determining their performance is within the skill set of those of ordinary skill in the relevant art, and the usage thereof within the context of the present invention will be readily apparent to one of such a skill level in light of this specification.

Additionally, in some embodiments of the present invention, a Process Initiation Monitor Component 105 of the Boot Sequence Manager 102 monitors each process 103 to determine whether it was initiated directly as part of the boot sequence or indirectly, by another process 103 or application 107 in the boot sequence. For example, if a single application 107 initiates three processes 103, then usage metrics of all three should be included in the calculated cost of the single application 107. By associating each process 103 with the application 107 that spawned it, the Process Initiation Monitor Component 105 can assign a discrete performance cost to each application 107 in the boot sequence. The implementation mechanics of determining which application 107 spawned which process 103 is within the skill set of those of ordinary skill in the relevant art, and the usage thereof within the context of the present invention will be readily apparent to one of such a skill level in light of this specification.

Once the performance costs have been calculated, a Boot Sequence Management User Interface 109 displays a list 111 of applications 107 and/or processes 103 started by the boot sequence. The estimated performance cost of each application 107 and process 103 in the boot sequence is also displayed. In other words, the Boot Sequence Management User Interface 109 shows the applications 107 and processes 103 that are automatically started at boot time, with the corresponding performance cost estimate for each. The Boot Sequence Management User Interface 109 provides an easy mechanism (e.g., a button or other user interface component, not illustrated) for the user to select to either remove an application 107 or process 103 from the boot sequence, and/or to uninstall it altogether. Responsive to input from the user, the selected applications 107 and/or processes 103 are removed from the boot sequence and/or uninstalled as directed. The implementation mechanics of presenting such information to a user, receiving corresponding user input and removing and uninstalling applications is within the skill set of those of ordinary skill in the relevant art, and the usage thereof within the context of the present invention will be readily apparent to one of such a skill level in light of this specification.

In one embodiment of the present invention, the Cost Analysis Component 101 weighs computing resources in heavy contention (e.g. maxed out CPU or physical memory swapped to disk) more heavily than resources that are in more abundant supply (e.g., physical disk access, network access on fast connection). This involves calculating relative process 103 resource usage at a component level. For example, suppose that a given process 103 uses X CPU cycles during the boot sequence. Suppose further that the total number of CPU cycles used by all processes 103 during the boot sequence is Y. The given process's 103 CPU cost would be calculated as a percentage X/Y. This cost could also be expressed as, e.g., a number of seconds X/Y*(boot time).

In this embodiment, the Cost Analysis Component 101 also determines relative resource contention, so as to implement weighing. Suppose that during the boot process CPU usage is at an average of 60% of capacity and, for example, disk input/output ("i/o") is running at an average of 30% of capacity. In this scenario, the Cost Analysis Component 101 could assume that CPU usage should be weighted two-to-one over disk i/o, which can be expressed as ((pct cpu cost)*2+ (pct disk i/o cost)*1)/3. Of course, the actual weightings used for the various computing resources could vary as desired, based on, for example, the type of resource, results of lab testing, user or administrator preferences. etc. The implementation mechanics of determining which resources are being most heavily utilized during the boot sequence and of assigning weights accordingly is within the skill set of those of ordinary skill in the relevant art, and the usage thereof within the context of the present invention will be readily apparent to one of such a skill level in light of this specification.

As will be understood by those familiar with the art, the invention may be embodied in other specific forms without departing from the spirit or essential characteristics thereof. Likewise, the particular naming and division of the portions, modules, agents, managers, components, monitors, interfaces, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, monitors, interfaces, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions and means of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for improving performance of a boot sequence, the method comprising the steps of:
   identifying local boot processes associated with the boot sequence on a specific computer;
   for each identified local boot process, monitoring usage of a plurality of hardware computing resources local to the specific computer during the boot sequence;
   determining a performance cost for each identified local boot process, a determined performance cost being based on monitored usage of the plurality of local hardware computing resources of the specific computer during the boot sequence on the specific computer;
   presenting identified local boot processes and associated performance costs to a user; and
   further comprising performing at least one step from a group of steps consisting of:
   providing the user with a user interface component for selecting local boot processes which the user wishes to remove from the boot sequence; and
   providing the user with a user interface component for selecting processes which the user wishes to uninstall based on the performance cost during the local boot sequence.

2. The method of claim 1 wherein determining a performance cost further comprises:
   determining whether each local boot process was initiated directly or spawned by a parent process; and
   including performance costs of spawned processes in the performance costs of corresponding parent processes.

3. The method of claim 1 wherein determining a performance cost further comprises:
   estimating the performance cost for an identified local boot process as a percentage of performance cost of the boot sequence.

4. The method of claim 1 wherein determining a performance cost for each identified local boot process further comprises:
   estimating the performance cost for an identified local boot process in units of time.

5. The method of claim 1 wherein presenting identified local boot processes and their associated performance costs to a user further comprises:

presenting identified local boot processes and associated performance costs at an application level, wherein the present performance cost of an application includes the performance cost of each local boot process of that application.

6. The method of claim 1 further comprising performing at least one step from a group of steps consisting of:

responsive to receiving input from the user indicating to remove at least one local process from the boot sequence, removing the at least one process from the boot sequence; and responsive to receiving input from the user indicating to uninstall at least one local boot process, uninstalling the at least one process based on the performance cost during the local boot sequence.

7. The method of claim 1 wherein determining a performance cost further comprises:

weighing usage of local hardware computing resources of the specific computer that are more highly contested during the boot sequence more heavily.

8. At least one non-transitory computer readable medium containing a computer program product for improving performance of a boot sequence, the computer program product comprising:

program code for identifying local boot processes associated with the boot sequence on a specific computer;

program code for each identified local boot process, monitoring usage of a plurality of hardware computing resources local to the specific computer during the boot sequence;

program code for determining a performance cost for each identified local boot process, a determined performance cost being based on monitored usage of the plurality of local hardware computing resources of the specific computer during the boot sequence on the specific computer;

program code for presenting identified local boot processes and associated performance costs to a user; and further comprising program code for performing at least one step from a group of steps consisting of:

providing the user with a user interface component for selecting local boot processes which the user wishes to remove from the boot sequence;

providing the user with a user interface component for selecting local boot processes which the user wishes to uninstall.

9. The computer program product of claim 8 wherein the program code for determining a performance cost further comprises:

program code for determining whether each local boot process was initiated directly or spawned by a parent process; and program code for including performance costs of spawned processes in the performance costs of corresponding parent processes.

10. The computer program product of claim 8 wherein the program code for determining a performance cost further comprises:

program code for estimating the performance cost for an identified local boot process as a percentage of performance cost of the boot sequence.

11. The computer program product of claim 8 wherein the program code for determining a performance cost for each identified local boot process further comprises:

program code for estimating the performance cost for an identified local boot process in units of time.

12. The computer program product of claim 8 wherein the program code for presenting identified local boot processes and their associated performance costs to a user further comprises:

program code for presenting identified local boot processes and their associated performance costs at an application level, wherein the present performance cost of an application includes the performance cost of each local boot process of that application.

13. The computer program product of claim 8 further comprising program code for performing at least one step from a group of steps consisting of:

responsive to receiving input from the user indicating to remove at least one local boot process from the boot sequence, removing the at least one local boot process from the boot sequence; and responsive to receiving input from the user indicating to uninstall at least one local boot process, uninstalling the at least one local boot process.

14. The computer program product of claim 8 wherein the program code for determining a performance cost further comprises:

program code for weighing usage of local hardware computing resources of the specific computer that are more highly contested during the boot sequence more heavily.

15. A computer system for improving performance of a boot sequence, the computer system comprising:

a processor;

a system memory; and a boot sequence manager residing in the system memory:

for identifying local boot processes associated with the boot sequence on a specific computer;

for each identified local boot process, monitoring usage of a plurality of hardware computing resources local to the specific computer during the boot sequence on the specific computer;

for determining a performance cost for each identified local boot process, a determined performance cost being based on monitored usage of the plurality of local hardware computing resources of the specific computer during the boot sequence;

for presenting identified local boot processes and an associated performance costs to a user; and further for performing at least one step from a group of steps consisting of:

providing the user with a user interface component for selecting local boot processes which the user wishes to remove from the boot sequence;

providing the user with a user interface component for selecting local boot processes which the user wishes to uninstall.

16. The computer system of claim 15 wherein the boot sequence manager is further:

for determining whether each local boot process was initiated directly or spawned by a parent process; and for including performance costs of spawned processes in the performance costs of corresponding parent processes.

17. The computer system of claim 15 wherein the boot sequence manager is further for performing at least one step from a group of steps consisting of:

responsive to receiving input from the user indicating to remove at least one local boot process from the boot sequence, removing the at least one process from the boot sequence; and responsive to receiving input from the user indicating to uninstall at least one local boot process, uninstalling the at least one local boot process.

\* \* \* \* \*